(12) United States Patent
Oh et al.

(10) Patent No.: US 9,385,834 B2
(45) Date of Patent: Jul. 5, 2016

(54) METHOD FOR INTERFERENCE ALIGNMENT USING MULTIPLE ANTENNAS IN OVERLAPPED MULTI-CELL OVERLAPPED ENVIRONMENT

(71) Applicant: Electronics and Telecommunications Research Institute, Daejeon (KR)

(72) Inventors: Jinhyung Oh, Daejeon (KR); Gwangzeen Ko, Daejeon (KR); Igor Kim, Daejeon (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 32 days.

(21) Appl. No.: 14/157,116

(22) Filed: Jan. 16, 2014

(65) Prior Publication Data

US 2014/0205034 A1  Jul. 24, 2014

(30) Foreign Application Priority Data

Jan. 18, 2013 (KR) .................. 10-2013-0005933
Dec. 18, 2013 (KR) .................. 10-2013-0157789

(51) Int. Cl.
*H04B 7/02* (2006.01)
*H04L 1/02* (2006.01)
*H04L 1/00* (2006.01)
*H04B 7/04* (2006.01)
*H04B 7/08* (2006.01)

(52) U.S. Cl.
CPC ............ *H04L 1/0009* (2013.01); *H04B 7/0456* (2013.01); *H04B 7/086* (2013.01)

(58) Field of Classification Search
CPC .... H04B 7/0452; H04B 7/0456; H04B 7/086; H04B 7/0632; H04B 15/00; H04L 1/0048; H04L 25/03171
See application file for complete search history.

(56) References Cited

U.S. PATENT DOCUMENTS

| | | | |
|---|---|---|---|
| 7,130,592 B2 | 10/2006 | Ishikawa | |
| 7,460,829 B2 | 12/2008 | Utsumi et al. | |
| 2007/0092019 A1* | 4/2007 | Kotecha et al. | 375/267 |
| 2009/0285325 A1* | 11/2009 | Zhou | 375/267 |

(Continued)

FOREIGN PATENT DOCUMENTS

| | | |
|---|---|---|
| JP | 4245330 B2 | 1/2009 |
| KR | 10-1021660 B1 | 3/2011 |
| KR | 10-1064386 B1 | 9/2011 |

OTHER PUBLICATIONS

Sadek, Mirette et al., "A Leakage-Based Precoding Scheme for Downlink Multi-User MIMO Channels", IEEE Transactions on Wireless Communications, vol. 6, No. 5, pp. 1711-1721, 2007.

(Continued)

*Primary Examiner* — Shuwang Liu
*Assistant Examiner* — Sung Ahn
(74) *Attorney, Agent, or Firm* — NSIP Law

(57) ABSTRACT

An interference alignment method using multiple antennas in a multi-cell overlapped environment, includes: when at least one transmission and reception ends having at least one or more antennas communicate with each other, establishing at least one or more channels from the transmission end to the reception end. Further, the interference alignment method includes designing a processing filter for a transmission signal transmitted from the transmission end to the reception ends; and designing a processing filter for a reception signal that is received by the reception end.

18 Claims, 4 Drawing Sheets

(56) References Cited

U.S. PATENT DOCUMENTS

2010/0232531 A1* 9/2010 Nam et al. .................... 375/267
2012/0281778 A1* 11/2012 Ruan et al. .................... 375/267
2012/0314791 A1* 12/2012 Zhang et al. .................. 375/267
2014/0334409 A1* 11/2014 Kim et al. ..................... 370/329

OTHER PUBLICATIONS

Oh, Jinhyung et al., "Distributed Implicit Interference Alignment in 802.11ac WLAN Network", International Conference on ICT Convergence (ICTC) Jeju, pp. 421-426, Oct. 15, 2013.

* cited by examiner

METHOD FOR INTERFERENCE ALIGNMENT USING MULTIPLE ANTENNAS IN OVERLAPPED MULTI-CELL OVERLAPPED ENVIRONMENT

CROSS-REFERENCE TO RELATED APPLICATIONS

The present invention claims priority of Korean Patent Application No. 10-2013-0005933, filed on Jan. 18, 2013, and Korean Patent Application No. 10-2013-0157789, filed on Dec. 18, 2013, which are incorporated herein by references.

FIELD OF THE INVENTION

The present invention relates to a method for interference alignment that is capable of reducing interference effect between cells and applicable to a real system by employing multiple antennas.

BACKGROUND OF THE INVENTION

In recent years, as the use of smart devices and the amount of demand data required for each device increase, a plurality of wireless LAN (Local Area Network) APs (Access Points) have been indiscriminately installed in order to solve the aforementioned issues. This results in that interference between APs disposed in adjacent cells becomes larger. The interference between adjacent cells causes the deterioration of system performance and an added difficulty in wireless LAN connection. An interference alignment has been proposed. The interference alignment refers to a technique to align interference signals to specific resources, e.g., such as time, space, frequency, etc. to minimize the interference so that a desired signal can be correctly sent to a desired reception end.

For example, when the interference alignment is done using multiple antennas in a wireless LAN environment, interference signals reached from different APs is assigned to specific spatial resources during signals are received at a station so as to secure as much as possible a space through which a desired signal can be sent, thereby making it easy to separate the desired signal from the interference signals. It is possible to obtain maximum performance if all of the users within the interference channel environment can take advantage of DoF (Degrees of Freedom) by up to half an antenna resource using the interference alignment technique.

The term of DoF used herein refers to a maximum number of streams that can transmit a signal without any interference. As such, this interference alignment technique has attracted a lot of attention in terms of being able to solve the problem of interference between adjacent cells. However, the interference alignment has several disadvantages in that a complex calculation is required when obtaining precoding/decoding signal processing filters that are used in transmission and reception ends, each node needs to know the large amount of radio channel condition information, and the number of antennas should be more than enough to make null the interference aligned in proportion to the number of interference sources.

In view of properties of algorithm of the existing interference alignment, it can be seen that it is difficult to apply the interference alignment algorithm to a real system. Basically, in order for applying the interference alignment algorithm to the real system, it is necessary to linearly apply the transmission and reception signal processing filters to the real system in order to maximize the time during which real data is transmitted. In some of the existing algorithms, there may be required the process of repetitively exchanging communications between the transmission and reception ends, which may result in excessively increased overhead when being applied to the real system.

Secondly, in the conventional algorithm, all of transmission and reception nodes need to know Global Channel State Information. However, the overhead may be introduced because each node needs to know even information about channels not related thereto the nodes. Therefore, it may cause degradation of system performance.

Thirdly, the transmitting node and the reception node may need to cooperate with each other when they perform the precoding/decoding processes. In this case, it is necessary a host controller that presents at upper stage or information sharing between the nodes intended to the cooperation, which makes it difficult to apply the interference alignment algorithm to the real system.

Finally, it is required that the interference alignment algorithm should be applied even any number of nodes. Basically, in an existing linear algorithm, there are many cases where the algorithm is applied to only a specific number of nodes. It is therefore hard to preemptively estimate the number of nodes which will participate in the interference alignment owing to the influence of increased interference. Accordingly, there is a need for the development of an algorithm capable of applying even a common number of nodes.

SUMMARY OF THE INVENTION

In view of the above, the present invention provides a method for designing an interference aligned transmission and reception signal processing filter that is capable of applying to a real radio communication system environment.

Further, the present invention provides a method for designing an algorithm that is capable of designing a linear transmission and reception signal processing filter based on a Local CSI (Channel State Information) so as to reduce a system overhead as described above so that each transmission and reception node dispersively defines its own transmission and reception signal processing filter and that is applicable even in a common number of transmission and reception pairs.

Further, the present invention provides to implement a precoding/decoding signal processing filter in a linear fashion, to implement the signal processing filter using only Local CSI which is channel information related to each node, to enable each node itself to calculate the signal processing filter based on the Local CSI, and to allow applying an algorithm even a common number of transmission and reception pairs.

In accordance with an embodiment of the present invention, there is provided an interference alignment method using multiple antennas in a multi-cell overlapped environment. The method includes when at least one transmission and reception ends having at least one or more antennas communicate with each other, establishing at least one or more channels from the transmission end to the reception end; designing a processing filter for a transmission signal transmitted from the transmission end to the reception ends; and designing a processing filter for a reception signal that is received by the reception end.

Further, the transmission end may be an AP (Access Point) and the reception end is a station.

Further, the designing a processing filter for a transmission signal may comprise representing the reception signal that is received by an i-th reception end as the following equation:

$$y_i = H_{ii}x_i + \sum_{j=1, j \neq i}^{K} H_{ij}x_j + n_i$$

here, $H_{ii}x_i$ represents a signal which has been passed through the channel at its own AP, $H_{ij}$ denotes the channel from a j-th transmission end to the i-th reception end, $$\sum_{j=1, j \neq i}^{K} H_{ij}x_j$$

represents a signal that is entered into through an interference channel from another AP, and $n_i$ represents noise at the i-th reception end.

Further, $x_i$ may denote a precoded signal and may be represented as follows:

$$x_i = V_i s_i$$

here, $V_i$ represents a precoding matrix (M×d) for an i-th user, $s_i$ represents the number of antennas, and d is the number of streams that the transmitter intends to transmit.

Further, the signal before passing through a reception decoding process in the station may be represented as following equation:

$$y_i = H_{ii}V_i s_i + \sum_{j=1, j \neq i}^{K} H_{ij}V_j s_j + n_i$$

Further, the signal after passing through a reception decoding process in the station may be represented as following equation:

$$\tilde{y}_i = D_i^H y_i = D_i^H H_{ii} V_i s_i + \sum_{j=1, j \neq i}^{K} D_i^H H_{ij} V_j s_j + D_i^H n_i$$

here, $D_i$ represents a reception signal processing matrix having the size of (N×d) (where N is the number of antennas in the receiving end); $n_i$ represents an AWGN vector whose means is zero and a variance is $\sigma^2$.

Further, the processing filter for a transmission signal may be designed using only a Local CSI (Channel State Information).

Further, the designing a processing filter for a transmission signal may comprise producing a new precoding vector through the use of the following equations:

$$H\_eff = H \cdot P_i$$

$$[\sim, \sim, V\_eff] = svd(H\_eff \cdot H\_eff)$$

$$HV_i = V\_eff$$

here, H_eff denotes an effective channel that multiply a precoding vector to maximize the SLNR by a channel that is produced in reality; H_eff denotes a hermittian value of the effective channel; svd denotes a Singular Value Decomposition; and V_eff denotes the new precoding vector that is newly produced.

Further, the processing filter for a reception signal may be designed using only a Local CSI (Channel State Information).

Further, the designing a processing filter for a reception signal may comprise causing the magnitude of the received interference signal to be zero through the use of the following equation:

$$D_i^H H_{ij} V_j = 0_i (i \neq j)$$

here, $D_i^H$ represents a reception filter.

Further, the designing a processing filter for a reception signal may comprise receiving the number of streams that the transmission end intends to transmit as many as $d_i$ through the use of the following equation:

$$D_i^H H_{ij} V_j = d_i (i = j).$$

With the configuration of the practical interference alignment method using the multiple antennas in a multi-cell overlapped environment of the embodiments as described above, it has a benefit that channel information by which each transmission and reception node requires to configure the signal processing filter is confined as local CSI. Further, it is possible for each transmission and reception node itself to design the signal processing filter and enable to apply the method even in a common number of transmission and reception pairs.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, the embodiments of the present invention will be described in detail with reference to the accompanying drawings.

Figure 1:
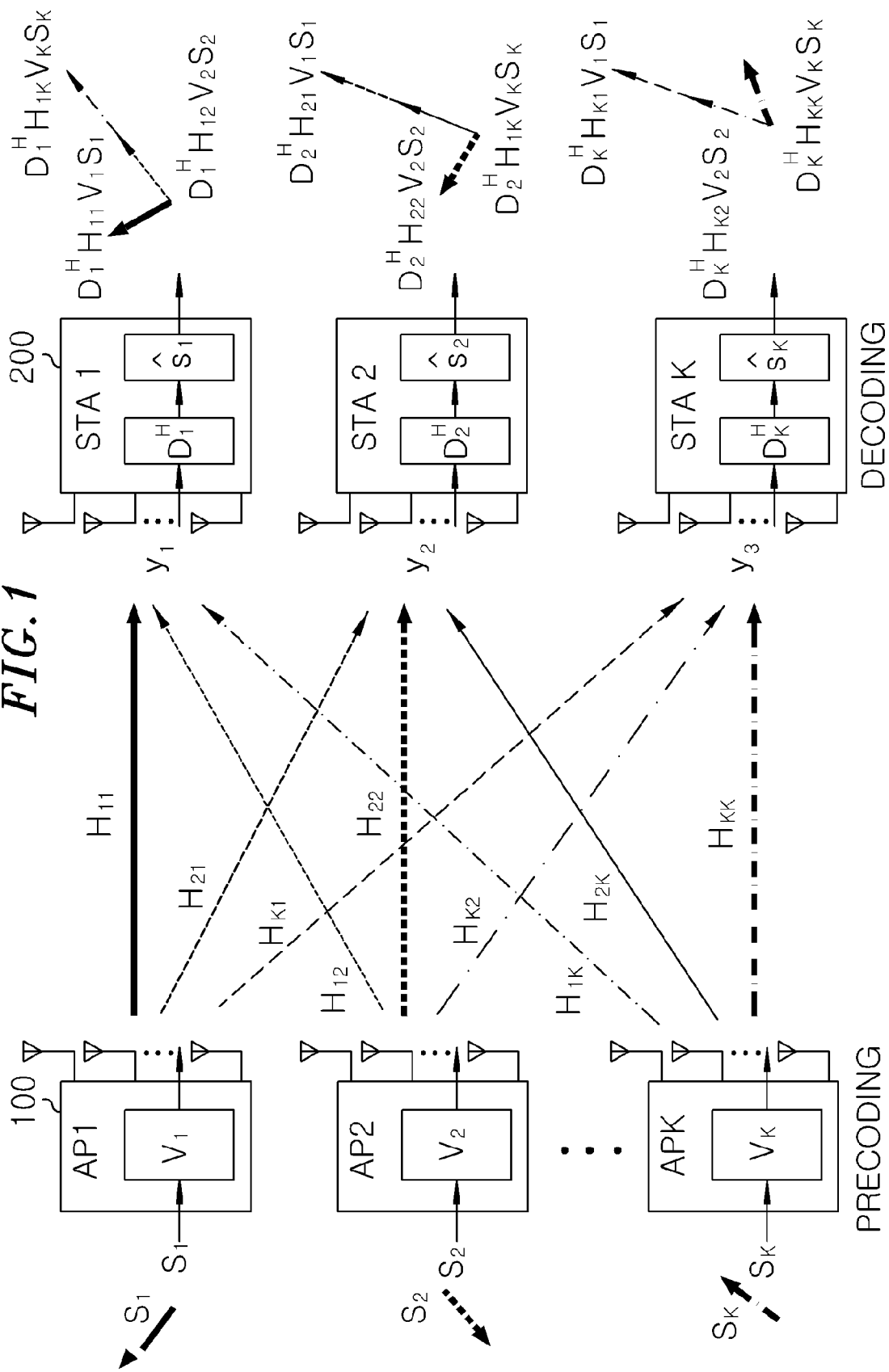
FIG. 1 shows a conceptual diagram illustrating interference channels for a K-number of users with multiple antennas in a wireless LAN environment.

FIG. 1 shows a conceptual diagram illustrating interference channels for a K-number of users with multiple antennas in a wireless LAN environment.

In particular, FIG. 1 illustrates a situation where several stations (referred to also as an 'STA') 200 and APs 100 communicate with each other through the same channels. It can be seen that different Aps are interfering different STAB. For example, it is assumed that each AP has an M-number of antennas and each STA has an N-number of antennas. Further, let a channel from a j-th AP to an i-th STA be $H_{ij}$. Then, a signal that is received by the i-th STA can be expressed in the following Equation 1.

$$y_i = H_{ii}x_i + \sum_{j=1, j \neq i}^{K} H_{ij}x_j + n_i \qquad \text{[Equation 1]}$$

where $H_{ii}x_i$ represents a signal which has been passed through a channel at its own AP, $$\sum_{j=1, j \neq i}^{K} H_{ij}x_j$$

represents a signal that is entered into through interference channels from another AP, and $n_i$ represents noise at a i-th reception end. In addition, $x_i$ denotes a precoded signal, which is represented as follows.

$$x_i = V_i s_i \qquad \text{[Equation 2]}$$

where $V_i$ represents a precoding matrix (M×d) for an i-th user and $s_i$ represents a signal intended to transmit. In the precoding matrix, d is the number of streams that a transmitter intends to transmit.

By substituting Equation 2 into the Equation 1, the following Equation 3 is obtained.

$$y_i = H_{ii}V_i s_i + \sum_{j=1, j \neq i}^{K} H_{ij}V_j s_j + n_i \qquad \text{[Equation 3]}$$

The Equation 3 represents a signal in the form before undergoing a decoding process. A signal after passing through the decoding matrix is expressed as follows.

$$\tilde{y}_i = D_i^H y_i = D_i^H H_{ii}V_i s_i + \sum_{j=1, j \neq i}^{K} D_i^H H_{ij}V_j s_j + D_i^H n_i \qquad \text{[Equation 4]}$$

where a decoding matrix $D_i$ represents a reception signal processing matrix having the size of (N×d); $n_i$ at a last term in the Equation 4 means an AWGN vector whose means is zero(0) and a variance is $\sigma^2$.

The present invention aims to design a transmission and reception signal processing filter based on the interference alignment that is capable of alleviating the interference between cells in an OBSS (Overlapped Basic Service Set) environment in which multiple cells overlap.

A transmission signal processing filter that will be discussed herein is designed in a two-step manner based on an SLNR (Signal to Leakage interference and Noise Ratio) and an SVD (Singular Value Decomposition). First of all, the following is a description of a first step. The SLNR considering in the first step means a ratio of a strength of a signal from a transmitter to a desired receiver versus a strength of an interference signal that affects the receiver.

Figure 3:
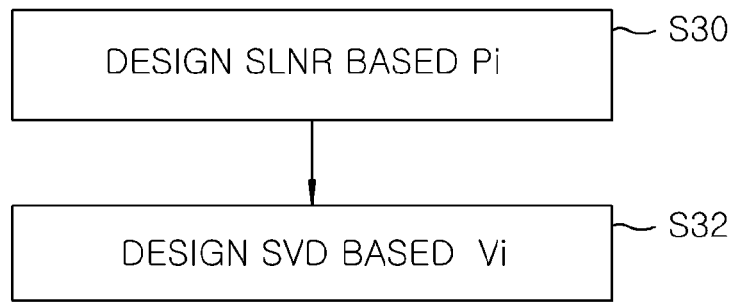
FIG. 3 is a flow diagram of a design methodology of a pre coder.
Figure 4:
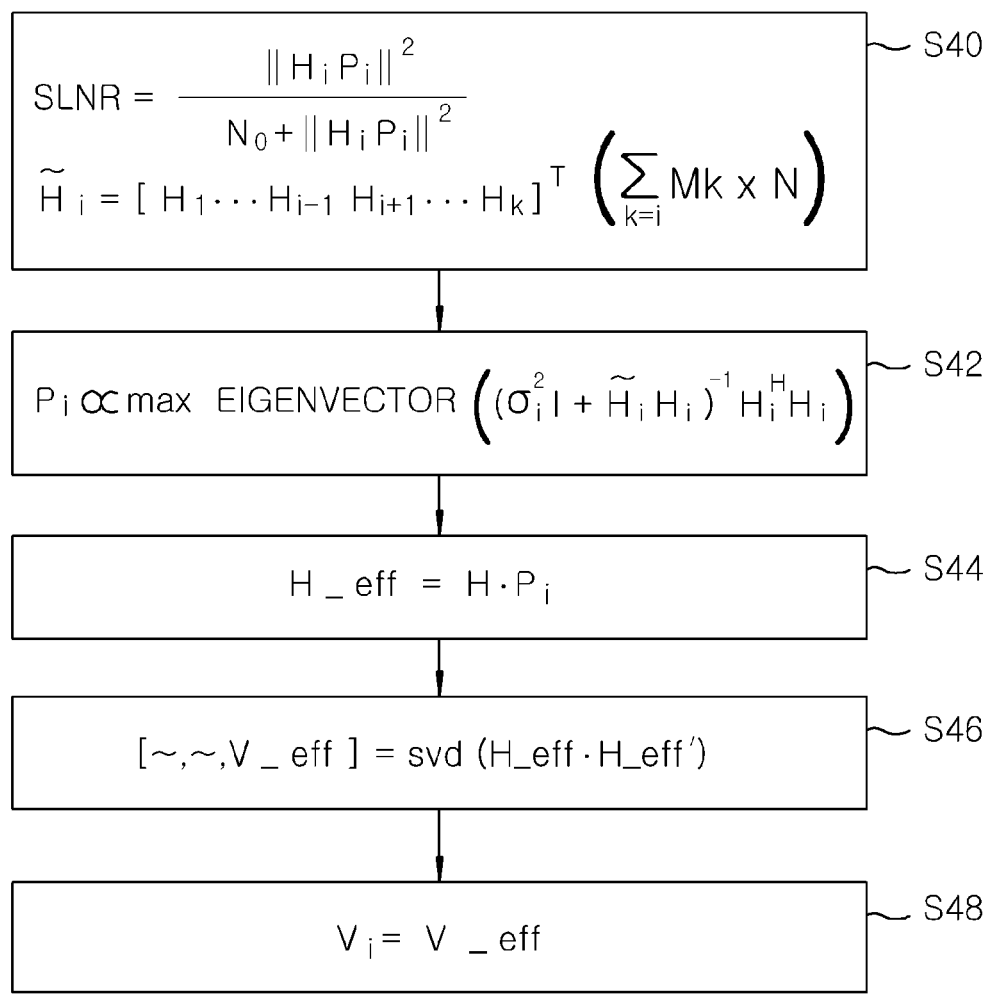
FIG. 4 is a detailed flow diagram of a design methodology of a precoder.

FIG. 3 and FIG. 4 illustrate a flow diagram of a design methodology of a precoder and a detailed flow diagram of a design methodology of a precoder, respectively.

As shown in FIG. 3, the SLNR is designed based on Pi in operation S30 and the SVD is designed based on Vi in operation S32.

Referring to FIG. 4, in operation S40, a method for acquiring a precoding vector P to maximize a value of the SLNR is as the following Equation 5 and Equation 6. Based on the definition of the SLNR as briefly set forth above, the precoding vector to maximize the SLNR can be obtained like the following Equations. The precoding vector to maximize the SLNR can be obtained by getting the largest eigenvector from a right formula in the Equation 6 in operation S42.

$$SLNR = \frac{\|H_i P_i\|^2}{N_0 + \|\tilde{H}_i P_i\|^2} \qquad \text{[Equation 5]}$$

$$\tilde{H}_i = [H_1 \ \ldots \ H_{i-1} H_{i+1} \ \ldots \ H_K]^T \left(\sum_{k \neq i} M_k \times N\right) \qquad \text{[Equation 6]}$$

$$P_i \propto \max \text{eigenvector}\left((\sigma_i^2 I + \tilde{H}_i^H \tilde{H}_i)^{-1} H_i^H H_i\right)$$

Figure 2:
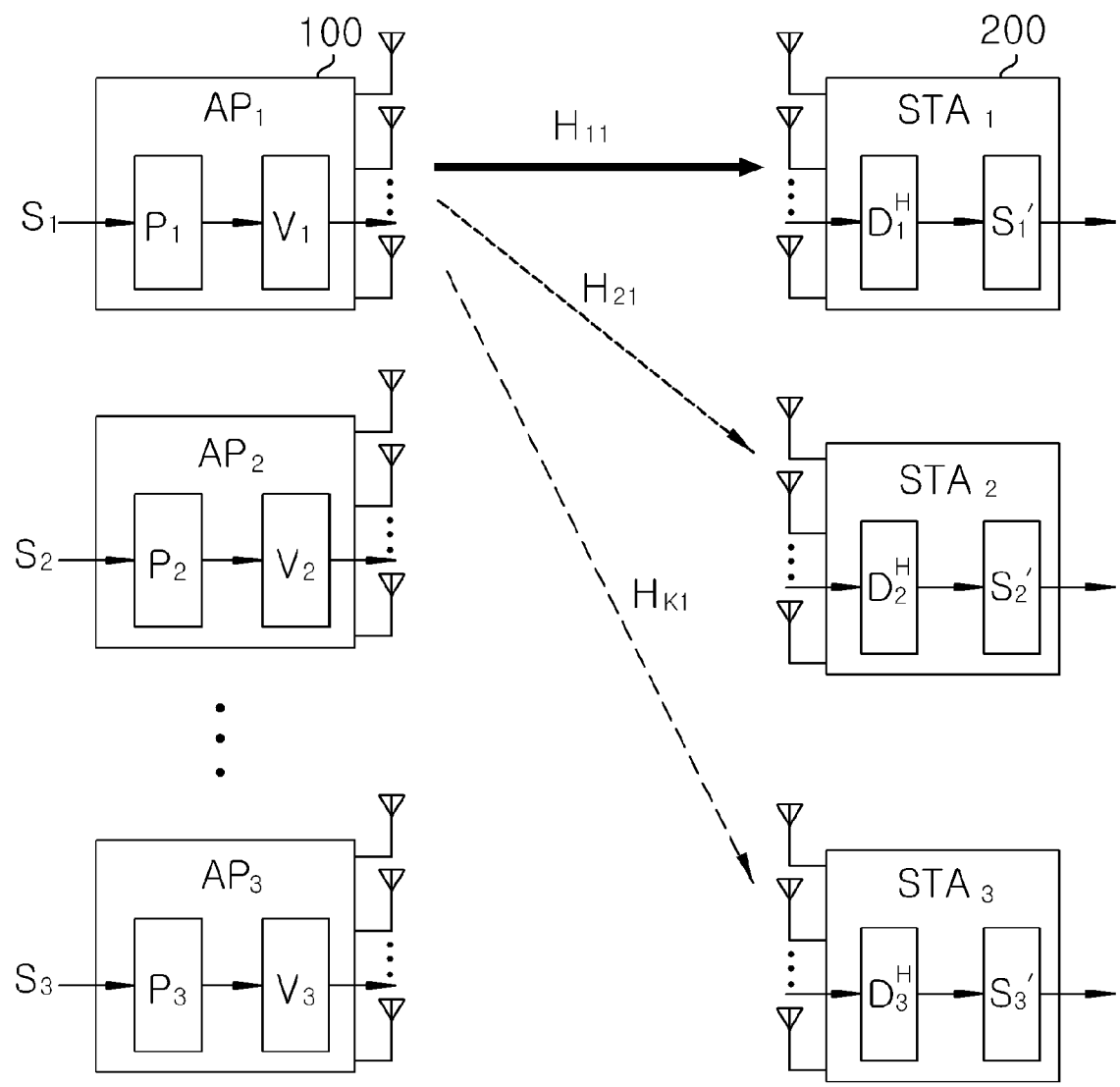
FIG. 2 shows transmission signal processing filters on interference channels for a K-number of users with a multiple antennas in a wireless LAN environment.

FIG. 2 shows transmission signal processing filters on interference channels for a K-number of users with a multiple antennas in a wireless LAN environment.

The description will be made on the second step of designing the transmission precoding vector based on the SVD which receives on its input a value of the precoding vector $P_i$ based on SLNR that is obtained at the first step. First, an effective channel is denominated as a value obtained by multiplying the precoding vector to maximize the SLNR obtained earlier to a channel that is produced in reality. Thereafter, the product of the effective channel and a hermittian value of the effective channel is obtained and the product result is then subjected to the SVD to generate a new precoding vector. The second step based on the SVD is necessary in order to improve the magnitude of the signal of a desired channel as compared with the method to obtain the precoding vector based on an existing max-SLNR. The second step in operations S44, S46 and S48 can be expressed as the following Equation 7, Equation 8, and Equation 9, respectively.

$$H\_\text{eff} = H \cdot P_i \qquad \text{[Equation 7]}$$

$$[\sim, \sim, V\_\text{eff}] = \text{svd}(H\_\text{eff} \cdot \overline{H}\_\text{eff}) \qquad \text{[Equation 8]}$$

$$HV_i = V\_\text{eff} \qquad \text{[Equation 9]}$$

Figure 5:
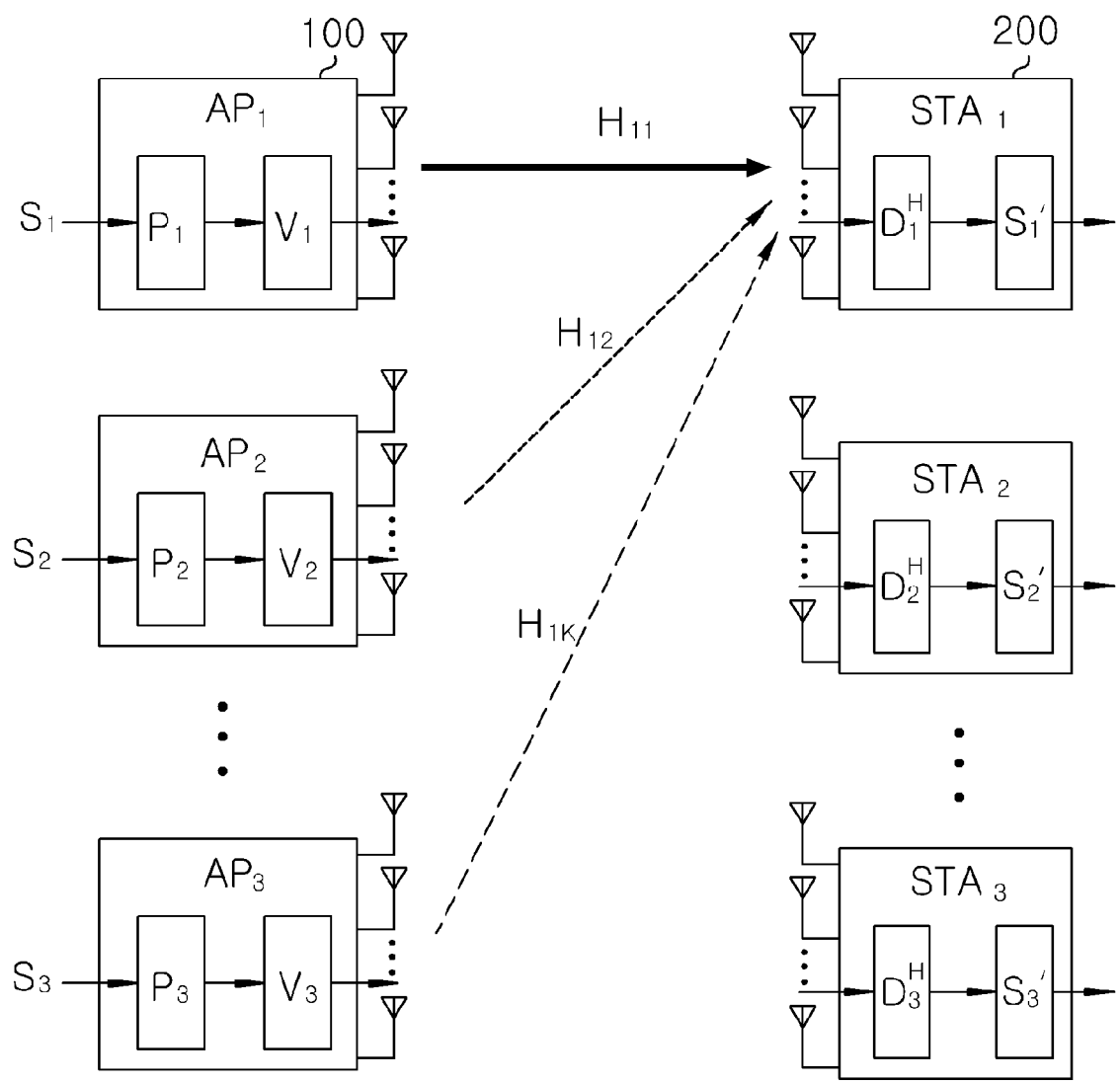
FIG. 5 shows reception signal processing filters on interference channels for a K-number of users with multiple antennas in a wireless LAN environment.

FIG. 5 shows reception signal processing filters on interference channels for a K-number of users with a multiple antennas in a wireless LAN environment.

A basic concept of designing a reception signal processing filter is an existing Zero-Forcing Nulling. The Zero-forcing Nulling refers to a basic concept that forces the magnitude of the interference signal received by a specific receiver to zero. This concept can be represented as the following Equation 10 and Equation 11.

$$D_i^H H_{ij} V_j = 0_i (i \neq j) \qquad \text{[Equation 10]}$$

$$D_i^H H_{ij} V_j = d_i (i = j) \qquad \text{[Equation 11]}$$

From the Equation 6, it can be seen that the signal influenced by the interference channel is made to be zero by applying the reception filter D. Meanwhile, On the contrary, it can be seen that a desired signal is received as many as the number of streams intended to transmit by applying the reception filter D.

In accordance with the present invention, proposed is a method for designing the transmission and reception signal processing filters to improve system performance using the interference alignment technique in an interference channel environment employing the multiple antennas. The existing Interference alignment technique may be generally divided into two types of techniques, a linear interference alignment technique and a repetitive alignment technique. However, it is difficult to apply these two types of techniques to a real system because of the following reasons. In case of the linear interference alignment technique, it has a problem that it is hard to obtain the transmission and reception signal processing filter in an environment where there are four or more transmitters and receivers due to the complexity to get the solution to the algorithm. Further, in case of the repetitive interference alignment technique, it has a problem that it requires a repetitive transfer of transmission and reception period in obtaining a solution to the algorithm, which causes a system overhead.

In order to solve the aforementioned problems, the present invention proposes a linear interference alignment method that is applied to an environment in which four or more transmitters and receivers are present. The present invention has the following three effects which will be described as follows.

Channel information by which each of the transmission and reception nodes requires to constitute a signal processing filter is limited to the local CSI. The respective transmission and reception nodes themselves are able to design their own signal processing filters using the local CSI. In other words, it is possible to implement the transmission and reception signal processing filters using only the local CSI which is program information related to each node and calculate the transmission and reception signal processing filters by the respective nodes themselves based on the Local CSI.

The present embodiment of the present invention is applicable to an environment in which there are a common number of the transmission and reception pairs.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An interference alignment method using antennas in a multi-cell overlapped environment, the method comprising, response to a transmission end and a reception end each having an antenna communicating with each other:

establishing a channel from the transmission end to the reception ends;

designing a processing filter for a transmission signal transmitted from the transmission end to the reception ends; and designing a processing filter for a reception signal that is received by the reception end, wherein the processing filter for the transmission signal is designed using only a local CSI (Channel State Information), and wherein said designing the processing filter for the transmission signal comprises:

producing a precoding vector $P_i$ to maximize a value of SLNR (signal to leakage and noise ratio) through:

$$\tilde{H}_i = [H_1 \ ... \ H_{i-1} H_{i+1} \ ... \ H_K]^T \left( \sum_{k \neq l} M_k \times N \right)$$

-continued $$P_i \propto \max \text{ eigenvector}\left( (\sigma_i^2 I + \tilde{H}_i^H \tilde{H}_i)^{-1} H_i^H H_i \right)$$

producing a new precoding vector through the precoding vector $P_i$ based on SLNR:

$$H\_eff = H \cdot P_i$$

$$[\sim,\sim,V\_eff] = \text{svd}(H\_eff \cdot H\_eff)$$

$$HV_i = V\_eff$$

where H_eff denotes an effective channel that multiplies the precoding vector to maximize SLNR by a channel that is produced in reality; H_eff denotes a hermittian value of the effective channel; svd denotes a Singular Value Decompositino; and V_eff denotes the new precoding vector.

2. The interference alignment method of claim 1, wherein the transmission end is an AP (Access Point) and the reception end is a station.

3. The interference alignment method of claim 2, wherein said designing a processing filter for a transmission signal comprises:

representing a reception signal that is received by an i-th reception end as:

$$y_i = H_{ii} x_i + \sum_{j=1, j \neq i}^{K} H_{ij} x_j + n_i$$

where $H_{ii}x_i$ represents a signal which has been passed through the channel at its own AP, $H_{ij}$ denotes the channel from a j-th transmission end to the i-th reception end, $$\sum_{j=1, j \neq i}^{K} H_{ij} x_j$$

represents a signal that is entered into through an interference channel from another AP, and $n_i$ represents noise at the i-th reception end.

4. The interference alignment method of claim 3, wherein $x_i$ denotes a precoded signal and is represented as follows:

$$x_i = V_i s_i$$

where $V_i$ represents a precoding matrix (M×d) for an i-th user, $s_i$ represents a number of antennas, and d is a number of streams that the transmitter intends to transmit.

5. The interference alignment method of claim 4, wherein the reception signal before passing through a reception decoding process in the station is represented as:

$$y_i = H_{ii} V_i s_i + \sum_{j=1, j \neq i}^{K} H_{ij} V_j s_j + n_i.$$

6. The interference alignment method of claim 4, wherein the reception signal in response to passing through a reception decoding process in the station is represented:

$$\tilde{y}_i = D_i^H y_i = D_i^H H_{ii} V_i s_i + \sum_{j=1, j \neq i}^{K} D_i^H H_{ij} V_j s_j + D_i^H n_i.$$

where $D_i$ represents a reception signal processing matrix having a size of (N×d), where N is the number of antennas in the receiving end $n_i$ represents an AWGN (Additive White Gaussian Noise) vector whose means is zero and a variance is $\sigma_2$.

7. The interference alignment method of claim 4, wherein the processing filter for a reception signal is designed using only a Local CSI (Channel State Information).

8. The interference alignment method of claim 4, wherein said designing a processing filter for a reception signal comprises causing a magnitude of the received interference signal to be zero through:

$$D_i^H H_{ij} V_j = 0_i (i \neq j)$$

where $D_i^H$ represents a reception filter.

9. The interference alignment method of claim 8, wherein said designing the processing filter for a reception signal comprises:
  receiving the number of streams that the transmission end intends to transmit as many as $d_i$ through:

$$D_i^H H_{ij} V_j = d_i (i = j).$$

10. A transmitter configured to communicate with a receiver via a channel in a multi-cell overlapped environment, the transmitter comprising:
  an antenna configured to communicate with a receiver;
  a processing filter configured to process a transmission signal transmitted from the transmitter to the receiver,
  wherein the processing filter configured to process the transmission signal is designed using only a local CSI (Channel State Information), and
  wherein the processing filter configured to filter the transmission signal satisfies:
  producing a precoding vector $P_i$ to maximize a value of SLNR (signal to leakage and noise ratio) through:

$$\tilde{H}_i = [H_1 \ldots H_{i-1} H_{i+1} \ldots H_K]^T \left( \sum_{k \neq l} M_k \times N \right)$$

$$P_i \propto \max \text{eigenvector}\left( (\sigma_i^2 I + \tilde{H}_i^H \tilde{H}_i)^{-1} H_i^H H_i \right)$$

produsing a new precoding vector through the precoding vector $P_i$ based on SLNR:

$H\_eff = H \cdot P_i$ $[\sim, \sim, V\_eff] = \text{svd}(H\_eff \cdot H\_eff)$ $HV_i = V\_eff$ where H_eff denotes an effective channel that multiplies the precoding vector to maximize SLNR by a channel that is produced in reality; H_eff denotes a hermittian value of the effective channel; svd denotes a Singular Value Decomposition; and V_eff denotes the new precoding vector.

11. The transmitter of claim 10, wherein $x_i$ denotes a precoded signal and is represented as follows:

$x_i = V_i s_i$ wherein $V_i$ represents a precoding matrix (M×d) for an i-th user, $s_i$ represents a number of antennas, and d is a number of streams that the transmitter intends to transmit.

12. The transmitter of claim 11, wherein a reception signal before passing through a reception decoding process in the receiver is represented as:

$$y_i = H_{ii} V_i s_i + \sum_{j=1, j \neq i}^{K} H_{ij} V_j s_j + n_i.$$

wherein $H_{ii} x_i$ represents a signal which has been passed through the channel at its own transmitter, $H_{ij}$ denotes a channel from a j-th transmitter to an i-th receiver, $$\sum_{j=1, j \neq i}^{K} H_{ij} x_j$$

represents a signal that is entered into through an interference channel from another transmitter, and $n_i$ represents noise at the i-th receiver.

13. The transmitter of claim 12, wherein the reception signal in response to passing through a reception decoding process in the receiver is represented as:

$$\tilde{y}_i = D_i^H y_i = D_i^H H_{ii} V_i s_i + \sum_{j=1, j \neq i}^{K} D_i^H H_{ij} V_j s_j + D_i^H n_i.$$

where $D_i$ represents a reception signal processing matrix having a size of (N×d), where N is a number of antennas in the receiver); $n_i$ represents an AWGN (Additive White Gaussian Noise) vector whose mean is zero and a variance is $\sigma^2$.

14. A receiver configured to communicate with a transmitter via a channel in a multi-cell overlapped environment, the receiver comprising:
  an antenna configured to communicate with a transmitter;
  a reception signal processing filter configured to process a reception signal that is received by the receiver, wherein the reception signal processing filter configured to process the reception signal is designed using only a local CSI (Channel State Information), and
  wherein a transmission signal processing filter configured to filter a transmission signal from the transmitter satisfies:
  producing a precoding vector $P_i$ to maximize a vaue of SLNR (signal to leakage and noise ratio) through:

$$\tilde{H}_i = [H_1 \ldots H_{i-1} H_{i+1} \ldots H_K]^T \left( \sum_{k \neq l} M_k \times N \right)$$

$$P_i \propto \max \text{eigenvector}\left( (\sigma_i^2 I + \tilde{H}_i^H \tilde{H}_i)^{-1} H_i^H H_i \right)$$

producing a new precoding vector through the precoding vector $P_i$ based on SLNR:

$H\_eff = H \cdot P_i$ $[\sim, \sim, V\_eff] = \text{svd}(H\_eff \cdot H\_eff)$ $HV_i = V\_eff$ where H_eff denotes an effective channel that multiplies the precoding vector to maximize SLNR by a channel that is produced in reality; H_eff denotes a hermittian value of the effective channel; svd denotes a Singular Value Decomposition; and V_eff denotes the new precoding vector.

15. The receiver of claim 14, wherein reception signal that is received by an i-th receiver is represented by:

$$y_i = H_{ii}x_i + \sum_{j=1, j \neq i}^{K} H_{ij}x_j + n_i$$

where $H_{ii}x_i$ represents a signal which has been passed through the channel at its own AP, $H_{ij}$ denotes a channel form a j-th transmitter to the i-th receiver, $$\sum_{j=1, j \neq i}^{K} H_{ij}x_j$$

represents a signal that is entered into through an interference channel from another transmitter, and $n_i$ represents noise at the i-th receiver.

16. The receiver of claim 15, wherein $x_i$ denotes a precoded signal and is represented as follows:

$$x_i = V_i s_i$$

where $V_i$ represents a precoding matrix (M×d) for an i-th user, $s_i$ represents a number of antennas, and d is a number of streams that the transmitter intends to transmit.

17. The receiver of claim 16, wherein the processing filter configured to filter the reception signal causes a magnitude of the received interference signal to be zero through:

$$D_i^H H_{ij} V_j = 0_i (i \neq j)$$

where $D_i^H$ represents the processing filter.

18. The receiver of claim 17, wherein the processing filter configured to filter the reception signal receives the number of streams that the transmitter intends to transmit as many as $d_i$ through:

$$D_i^H H_{ij} V_j = d_i (i \neq j).$$

* * * * *